(No Model.)

R. M. WILLIAMS.
CULTIVATOR.

No. 288,288.                        Patented Nov. 13, 1883.

Witnesses.
A. Ruppert
H. J. England.

R. M. Williams.
Inventor:
Holloway & Blanchard
Atty.

UNITED STATES PATENT OFFICE.

ROBERT M. WILLIAMS, OF NEW MARKET, VIRGINIA.

CULTIVATOR.

SPECIFICATION forming part of Letters Patent No. 288,288, dated November 13, 1883.

Application filed July 25, 1883. (No model.)

*To all whom it may concern:*

Be it known that I, R. M. WILLIAMS, a citizen of the United States, residing at New Market, in the county of Shenandoah and State of Virginia, have invented certain new and useful Improvements in Wheel-Cultivators, of which the following is a specification, reference being had therein to the accompanying drawings.

My invention relates to certain new and useful improvements in wheel-cultivators adapted to be used either by hand or drawn by an animal.

The object of my invention is to arrange a plow or shovel vertically in a frame having wheels, the frame and wheels so arranged that the handles are reversible from front to rear, adjustable as to height, and the whole device adapted to be used by hand or animal power. I attain these objects by means of the peculiar arrangement of the various parts of my device, which will be more fully pointed out and described in the specification and claim, reference being had to the drawings accompanying this application and forming part of the same, in which—

Figure 1:
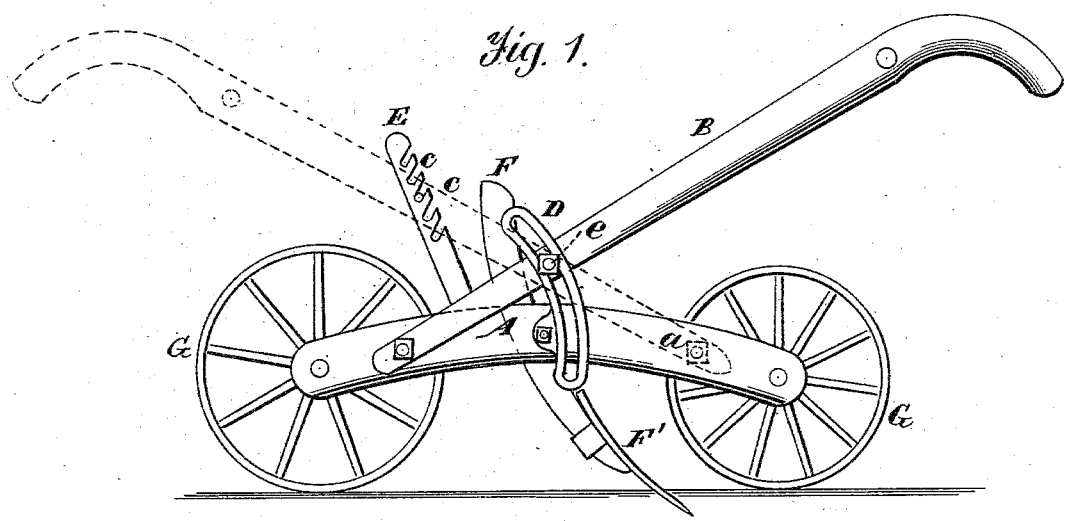
Figure 2:
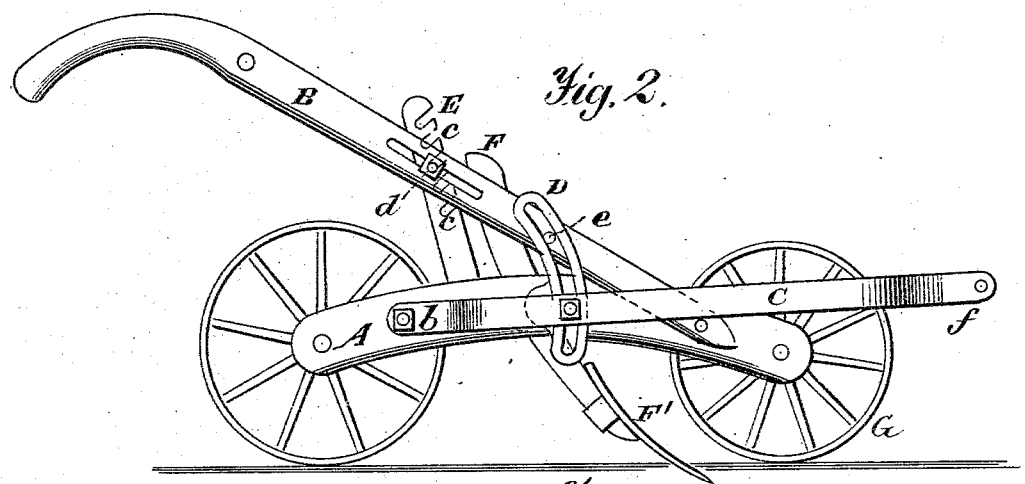
Figure 3:
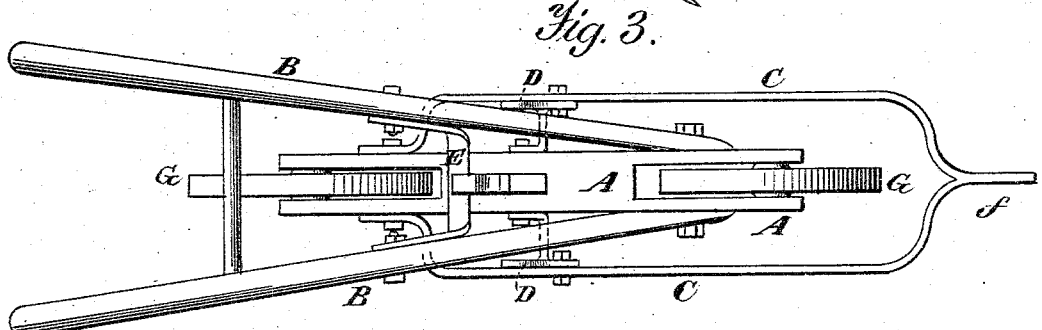

Figure 1 is a perspective view of my invention, showing the handles turned to the front, by which the device is drawn by hand. Fig. 2 is a side view of the same, showing the handles reversed and clevis attached for animal-power. Fig. 3 is a top plan view, showing the parts in place.

Similar letters refer to similar parts throughout the drawings.

Referring to the drawings, A represents a frame formed with an upward curve from each end, said ends being slotted and fitted with bearings for wheels, as shown.

Handles B are secured to the front end of frame A by a bolt and nut, the outer ends of the same being formed in the usual manner.

Longitudinal slots are formed in handles B at a point near the center of the same, to receive clamp-bolts *d*, which are adapted to fit into notches cut in braces E, said braces being secured to the top of frame A, and extending upward and outward on the inside of handles B, near the slots in the same, as shown in Figs. 1 and 2. The purpose of this construction is to hold the handles B in a position to suit the operator. A short distance in front of said brace the frame A is perforated to receive the plow-standard F, which is adjustable vertically in said perforation.

Secured to the outside of frame A, on either side of the same, are slotted curved guides D, adapted to receive a clamp-bolt passing through the handles B, by means of which said handles are adjusted to suit the operator when the handles are reversed with their outer ends to the front, by which the cultivator is drawn by the operator when desired. Bolt A is removed when the handles are reversed and placed in the perforation in the opposite end of frame A. Said curved slotted guide-plates are secured to the outer face of frame A by means of a bolt passing through a perforation in a flange formed in the side of guide-plates.

A metal loop or clevis, C, having a perforation, *f*, at its outer end, by which power is attached, is attached by its inner ends to the sides of frame A by means of bolt *b*.

The operation of the device is as follows: When desired, an animal is attached to the outer end of clevis C. The operator grasps the handles that are turned in position, as shown in Fig. 2. When used as hand-power only, the operator grasps the handles that are in position shown in Fig. 1, when, by drawing the device along after him, the soil is loosened and the vegetables cultivated. When desired, the handles are reversed, and the operator, following in the rear, grasps the handles and pushes the cultivator forward, the position of the operator in this case being at times very important in cultivation of vegetables, frequently for the lack of room in having power attached to the front of the device.

Having thus described my invention, what I claim, and desire to secure by Letters Patent, is—

In a two-wheeled cultivator, the combination of the curved frame A, the plow-standard F, the draw-clevis C, the forked brace E, having notches *c*, bolts *d*, *e*, and *b*, and the curved slotted guides D, secured to the sides of the frame A, with the reversible and adjustable handles B, substantially as shown and specified.

In testimony whereof I affix my signature in presence of two witnesses.

ROBERT M. WILLIAMS.

Witnesses:
 WM. H. RICE,
 G. P. WINDE.